(12) United States Patent
Schenk (10) Patent No.: US 9,527,137 B2
(45) Date of Patent: Dec. 27, 2016

(54) POWER DRILL

(71) Applicant: Peter Schenk, Niederstotzingen (DE)

(72) Inventor: Peter Schenk, Niederstotzingen (DE)

(73) Assignee: ROEHM GmbH, Sontheim (DE)

( * ) Notice: Subject to any disclaimer, the term of this patent is extended or adjusted under 35 U.S.C. 154(b) by 149 days.

(21) Appl. No.: 14/287,687

(22) Filed: May 27, 2014

(65) Prior Publication Data

US 2014/0374999 A1 Dec. 25, 2014

(30) Foreign Application Priority Data

Jun. 21, 2013 (DE) ......................... 10 2013 106 520

(51) Int. Cl.
*B23B 31/12* (2006.01)
*B23B 45/00* (2006.01)

(52) U.S. Cl.
CPC ......... *B23B 31/123* (2013.01); *B23B 31/1253* (2013.01); *B23B 45/00* (2013.01); *B23B 31/1207* (2013.01); *B23B 2231/06* (2013.01); *B23B 2231/38* (2013.01); *B23B 2260/0445* (2013.01); *B23B 2260/07* (2013.01); *Y10S 279/902* (2013.01); *Y10T 279/17* (2015.01); *Y10T 279/17615* (2015.01); *Y10T 279/17623* (2015.01); *Y10T 279/17649* (2015.01); *Y10T 408/65* (2015.01)

(58) Field of Classification Search
CPC ............. B23B 31/1207; B23B 31/1253; B23B 2231/06; B23B 2231/38; B23B 2260/07; Y10T 279/17615; Y10T 279/17649; Y10T 408/65; Y10S 279/902
See application file for complete search history.

(56) References Cited

U.S. PATENT DOCUMENTS

| 1,250,864 | A | * | 12/1917 | Halstead | ............. B23B 31/1253 |
| | | | | | 279/58 |
| 2,806,365 | A | * | 9/1957 | Hennig | ..................... F16D 3/64 |
| | | | | | 464/16 |
| 3,470,710 | A | * | 10/1969 | Feller | ......................... F16D 3/68 |
| | | | | | 464/93 |
| 4,103,914 | A | * | 8/1978 | Rohm | ................. B23B 31/1223 |
| | | | | | 279/4.07 |
| 7,588,398 | B2 | * | 9/2009 | Puzio | .................. B23B 31/1253 |
| | | | | | 279/135 |

(Continued)

*Primary Examiner* — Eric A Gates
*Assistant Examiner* — Chwen-Wei Su
(74) *Attorney, Agent, or Firm* — Andrew Wilford (57) ABSTRACT

A power drill has a housing holding a motor and a drive member rotatable about an axis. An arbor extending along the axis outside the housing is rotationally coupled by complementary formations with the drive member. A tube shaft on which is fixed a chuck body holding a plurality of axially displaceable jaws. A sleeve in the tube shaft is rotationally coupled to the arbor. A pusher element braced axially forward against the jaws extends axially rearward into the sleeve, and interengaging screwthreads on the sleeve and pusher element axially displace the pusher element and the jaws on relative rotation of the sleeve and pusher element. A setting sleeve rotationally coupled to the rear end of the tube shaft is axially displaceable between a tightening position engaging a slip coupling on the housing and a drilling position disengaged from the slip coupling and rotationally coupled to the arbor.

11 Claims, 6 Drawing Sheets

(56) References Cited

U.S. PATENT DOCUMENTS

| | | | | |
|---|---|---|---|---|
| 7,690,658 B2* | 4/2010 | Puzio | ............... | B23B 31/1253 |
| | | | | 279/134 |
| 7,726,917 B2* | 6/2010 | Mack | ............... | B23B 31/123 |
| | | | | 279/140 |
| 7,806,636 B2* | 10/2010 | Puzio | ............... | B23B 31/123 |
| | | | | 279/140 |
| 2006/0202435 A1* | 9/2006 | Rohm | ............... | B23B 31/1238 |
| | | | | 279/62 |
| 2006/0232022 A1* | 10/2006 | Nickels | ............... | B23B 31/1238 |
| | | | | 279/60 |
| 2007/0182108 A1* | 8/2007 | Mack | ............... | B23B 31/1253 |
| | | | | 279/60 |
| 2007/0235952 A1* | 10/2007 | Mack | ............... | B23B 31/123 |
| | | | | 279/62 |

* cited by examiner

POWER DRILL

FIELD OF THE INVENTION

The present invention relates to a power drill.

BACKGROUND OF THE INVENTION

A power drill is known comprising a power unit with a drive member and housing holding a rotatable shaft, and a drill chuck for coupling with the drive member having a chuck body rotationally coupled to the shaft and in which chuck jaws are moved by screwthreads between a sleeve rotationally coupled to an arbor and a pusher element, and a setting sleeve that can be moved between a drilling position and a tightening position in which the chuck jaws are adjusted.

Such power drills are known from US 2012/0274035, for example, and serve for switching the power drill, by a simple hand movement, between a tightening position in which relative rotation between the arbor and the shaft that adjusts the clamping jaws is possible, and a drilling position in which the shaft is rotationally connected with the arbor. In DE 10 2011 002 331, a drive member sleeve that serves as a setting sleeve is provided for this purpose; this sleeve is always rotationally connected with the arbor and can be selectively coupled with the drilling spindle in order to switch the power drill between the tightening position and the drilling position. In the power drill according to DE 10 2011 002 331, the drive member sleeve is integrated into the drive member of the power unit—specifically into its gear mechanism. Thus, for axial adjustment of the drive member sleeve between the drilling position and the tightening position, the complete planetary gear mechanism of the drive member must be axially moved by the ring gear, in order to be able to couple the arbor with the drilling spindle by the drive member sleeve. Although the power drill shown in DE 10 2011 002 331 has proven itself, it naturally brings with it the disadvantage that an extremely profound intervention in the parts of the power drill on the power unit side is required by it, which can particularly make retrofitting of any power units more difficult and able to be implemented only with very great effort.

OBJECTS OF THE INVENTION

It is therefore an object of the present invention to provide an improved power drill.

Another object is the provision of such an improved power drill that overcomes the above-given disadvantages, in particular that has a compact structure and can be used with different power units, with the lowest possible adaptation effort.

SUMMARY OF THE INVENTION

This object is attained according to the invention in a power drill of the type described above in that complementary coupling formations are provided on the arbor and the drive member to form a direct connection, that the setting sleeve is spaced axially from the drive member toward the drill chuck, and that the setting sleeve is permanently rotationally connected with the shaft but axially displaceable thereon.

By providing the setting sleeve on the shaft and axially spacing the drive member and setting sleeve, the setting sleeve serves exclusively for switching the power drill between the tightening position and the drilling position. This way, the result is also particularly achieved in that no modification needs to be made on the drive member side to switch the power drill between the drilling position and the tightening position. Because of the complementary coupling formations that are provided on the drive member, the rotation direction of which can advantageously be reversed, and on the arbor, the power drill can be used even with a standard power unit, because the arbor can be connected with the power unit in the conventional manner, without having to make considerable adaptation efforts beforehand. Non-round coupling formations such as polygonal surfaces are particularly possible for this coupling.

It has proven to be particularly advantageous if the coupling formation of the drive member is provided on a planetary carrier of a planetary transmission of the drive member. This has a positive effect on assembly, because the planetary carrier has sufficient space, particularly in the case of power units that have a gear transmission, so that the coupling formation can be provided on it. Furthermore, the planetary carrier is also easily accessible, and this also facilitates assembly.

It is furthermore advantageous if the setting sleeve is rotationally coupled with the arbor in the drilling position. By coupling the arbor with the setting sleeve in the drilling position, the result is guaranteed that the shaft, which is also rotationally connected with the setting sleeve, is driven by the arbor. Thus, relative rotation between the shaft and the arbor, which could result in unintentional loosening of the chuck jaws, is prevented. Within the scope of the invention, however, the setting sleeve is not brought into engagement with the arbor. In this case, the flow of force when the chuck jaws are tightened runs from the arbor through the sleeve to the tightened chuck jaws, from there to the chuck body and ultimately to the shaft, which is therefore merely carried along by rotation of the arbor. Therefore relative rotation between the arbor and the shaft would also be prevented in this connection.

It has also proven to be advantageous if the arbor has external locking gear teeth to mesh with internal gear teeth of the setting sleeve in the drilling position. Because such locking gear teeth can be produced in simple manner, this has a positive effect on the production costs of the arbor and thereby on the production costs of the entire drill chuck according to the invention. However, it is also within the scope of the invention that the locking gear teeth is installed onto the arbor from the side facing the drive member, as a separate component, during assembly of the power drill.

For functional reliability of the drill chuck according to the invention, it has also proven to be advantageous if an elastic element is provided for urging the setting sleeve from the tightening position into the drilling position. In this way, unintentional adjustment of the chuck jaws is particularly prevented, because the setting sleeve is always being biased from the tightening position into the drilling position by the elastic element. If the arbor has locking gear teeth, then the elastic element furthermore offers the decisive advantage that during movement of the setting sleeve from the tightening position into the drilling position, in the event of axial misalignment of the locking gear teeth of the arbor and the gear teeth of the setting sleeve, the setting sleeve is automatically axially moved by the compressed elastic element when the arbor starts up, and thus the shaft is rotationally connected with the arbor.

It is furthermore particularly advantageous if the sleeve is integral with the arbor. In this way, top-heaviness of the power drill according to the invention is reduced effectively, and furthermore an extremely compact power drill is the result.

Furthermore, it has proven to be advantageous if the setting sleeve can be rotationally coupled with the housing in the tightening position. In this way, the shaft rotationally connected with the setting sleeve can be rotationally coupled with the housing in the tightening position, thereby relatively rotating the arbor and the shaft when the drive member is activated, which rotation leads to adjustment of the chuck jaws. However, it is also within the scope of the invention that the setting sleeve is fixed in place on other components, for is relative rotation between the arbor and the shaft, further, in particular, it is also provided, in this connection, that the shaft is also structured so that it can rotate relative to the housing in the tightening position, where in this case, the rotational speed of the shaft differs from that of the arbor.

In this connection, it has proven to be particularly advantageous if a slip coupling is provided between the setting sleeve and the housing in the tightening position. The tightening or loosening movement of the chuck jaws can be limited in a simple and effective manner by the slip coupling. In this way, overly high tightening forces, which would lead to destruction of the tool to be placed in the chuck, are particularly avoided. Furthermore, in this way the chuck jaws are also effectively prevented from becoming fixed in place during rearward movement in the chuck body, which could perhaps make tightening impossible and therefore would make the power drill unusable. In this connection, it has also proven to be particularly advantageous if the slip coupling is formed by a radially acting coupling sleeve that has at least one outwardly open entrainment seat to receive a coupling element that can be moved radially outward counter to the force of a biasing element. The slip coupling can be produced in a simple and cost-advantageous manner by the coupling elements that are preferably formed as cylindrical coupling rollers within the scope of the invention, and it has also proven successful if the number of coupling elements corresponds to the number of entrainment seats.

It has also proven to be advantageous within the scope of the invention if the biasing element is formed by a leaf spring. This leaf spring, which can be formed from spring steel, for example, can have a notch to accommodate the coupling element. A long useful service life and elastic deformability of the slip clutch, in particular, can be guaranteed by a suitable material selection. In this connection, it has also proven successful if the surface of the leaf spring that faces away from the coupling element is reinforced with vulcanizate. The coupling moment of the radial slip coupling can be increased in a simple and cost-advantageous manner by the vulcanizate, which advantageously is formed of rubber but also comprises other polymers.

It has furthermore proven to be particularly advantageous if the coupling sleeve has inner coupling gear teeth for rotational coupling with a external gear teeth of the setting sleeve. Thus, the coupling sleeve can be coupled with the slip coupling in a simple and effective manner. However, it is also within the scope of the invention that the setting sleeve and the coupling sleeve are connected with one another by a different type of complementary fit. It is also advantageous if the setting sleeve is axially adjustable by a coupling wire coupled with a wherein preferably of the housing. Thus, the setting sleeve can be axially moved between the drilling position and the tightening position in a simple and effective manner by movement of the control ring. In this connection, both movement in the radial direction—in other words rotation—and also in the axial direction, or a combination of the above-described movements, lies within the scope of the invention.

There is also a positive influence on the field of use of the drill chuck according to the invention if the shaft and the arbor are acted on by springs. In this way, the drill chuck according to the invention can also be used for hammer drilling.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing.

SPECIFIC DESCRIPTION OF THE INVENTION

Figure 1:
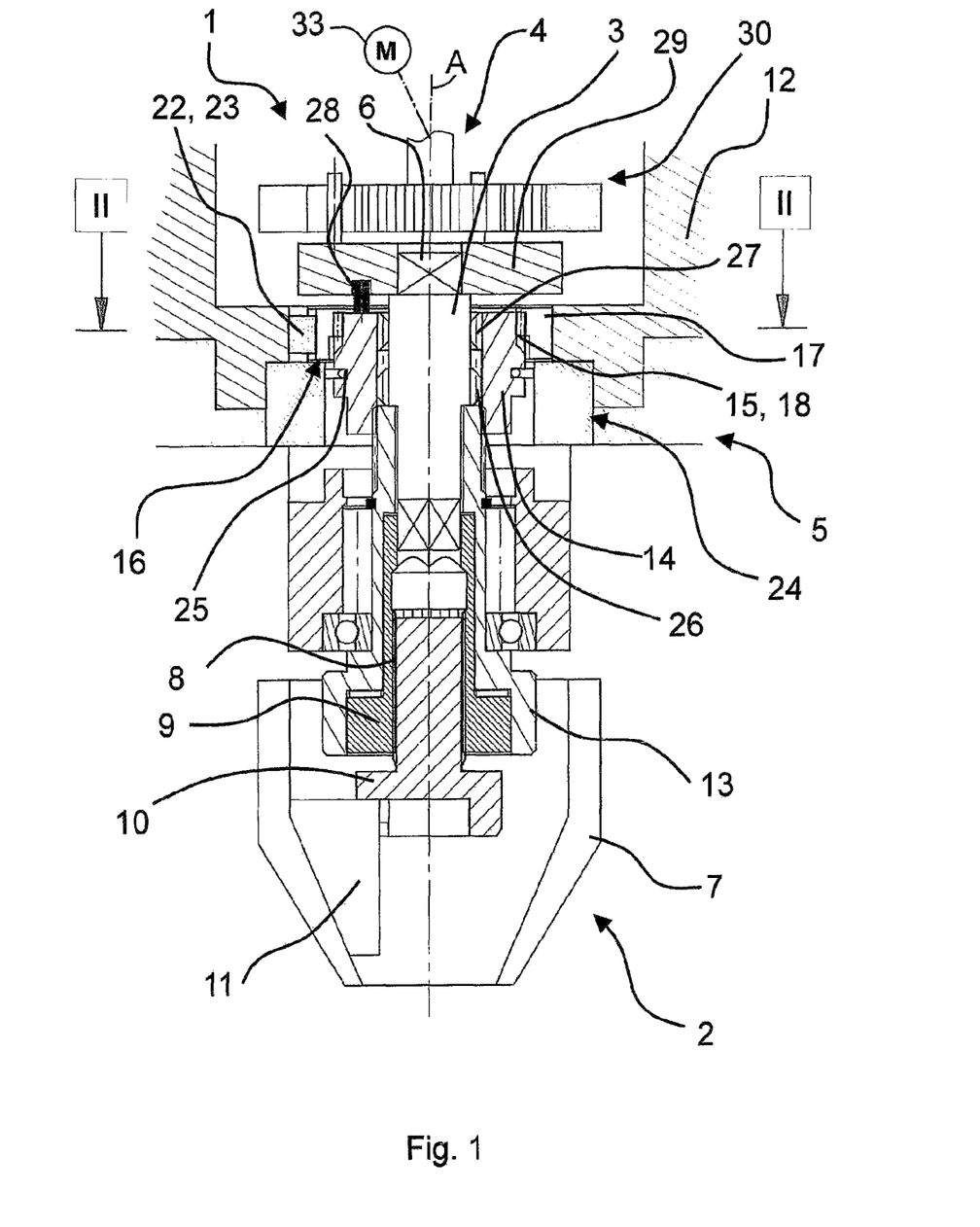
FIG. 1 is a section through of a first embodiment of the power drill according to the invention in the tightening position.

As seen in FIG. 1 a power drill 1 according to the invention has a drill chuck 2 coupled with a drive member 4 of a power unit 5 by an arbor 3. A motor 33 in the housing 12 rotates the member 4 about an axis A. For this purpose, the arbor 3 and the drive member 4 have complementary coupling formations 6 for a direct torque-transmitting connection.

The drill chuck 2 has a chuck body 7 in which chuck jaws 11 are movable by interengaging screwthreads 8 between a sleeve 9 and a pusher element 10. For this, the sleeve 9 is coupled to the arbor 3 for joint rotation therewith about the axis A. Furthermore, a tube shaft 13 rotatable in a housing 12 of the power unit 5 and rotationally coupled to the chuck body 7 is permanently rotationally coupled to a setting sleeve 14 that can shift axially between the tightening position shown in FIG. 1 and the drilling position shown in FIG. 3, with the setting sleeve 14 being spaced axially forward from the drive member 4 toward the drill chuck 2 and axially movable along the shaft 13.

In the tightening position, the setting sleeve 14 is shifted axially rearward toward the drive member 4 and connected with a radially effective slip coupling 16 on the housing 12, with force fit for radial coupling via external gear teeth 15. The slip coupling 16 meshes inwardly with the external gear teeth 15 of the setting sleeve 14 via teeth 18 of a coupling sleeve 17. The coupling sleeve 17 has a plurality of outwardly open entrainment seats 19 for respective coupling elements formed by rollers 22 that are movable against the force of respective biasing leaf springs 20. To move the setting sleeve 14 between the tightening position and the drilling position, a control ring 24 is provided on the housing 12 and is axially coupled with the setting sleeve 14 by a coupling wire 25 for axial joint movement.

If the drive member 4 is now rotated in a tightening direction in the tightening position, the arbor 3 rotates relative to the shaft 13 that is rotationally coupled with the housing 12 by the slip coupling 16. Therefore the pusher element 10 rotates relative to the sleeve 9 rotationally connected with the arbor 3, thereby axially shifting the pusher element 10 and thereby moving the chuck jaws 11 in the body 7 axially forward and also radially inward. If the chuck jaws 11 engage an unillustrated tool to be gripped during this tightening, then the slip coupling 16 is activated if a tightening moment predetermined by the slip coupling 16 is exceeded. The coupling rollers 22 move radially outward out of the respective entrainment seats 19 against the leaf springs 20, and free the coupling sleeve 17. The shaft 13 can thus be rotated by the coupling sleeve 17 and the setting sleeve 14 connected with it. Thus, further tightening of the chuck jaws 11 is prevented after the maximal tightening moment has been reached.

On reversal of the rotation direction of the drive member 4—in other words when the chuck jaws 11 are opened—the slip coupling 16 is also activated after the loosening moment predetermined by the slip coupling 16 has been reached—as described above. Then, the shaft 13 is also rotated by coupling sleeve 17 and the setting sleeve 14 connected with it. Further adjustment of the chuck jaws 11 therefore no longer takes place after the maximal loosening moment has been reached.

Locking gear teeth 26 are provided on the arbor 3 that rotationally couple the arbor 3 with gear teeth 27 on the setting sleeve 14, in order to prevent relative rotation between the shaft 13 and the arbor 3 in the drilling position. In the tightening position, the setting sleeve 14 is acted on by an elastic element 28 that is supported, in the embodiment shown, on a planetary carrier 29 of a planetary gear mechanism 30 forming part of the drive member 4, such that a force is constantly urging the setting sleeve 14 axially from the tightening position into the drilling position in the tightening position. This is particularly advantageous if, in the case of manual activation of the setting sleeve 14, the locking gear teeth 26 on the outer surface of the arbor 3 are not axially aligned with the gear teeth 27 of the setting sleeve 14. When the drive member 4 starts up, the setting sleeve 14 is pushed into mesh with the locking gear teeth 26 of the arbor 3 by the elastic element 28 to thereby rotationally couple the arbor 3 with the shaft 13.

Figure 2:
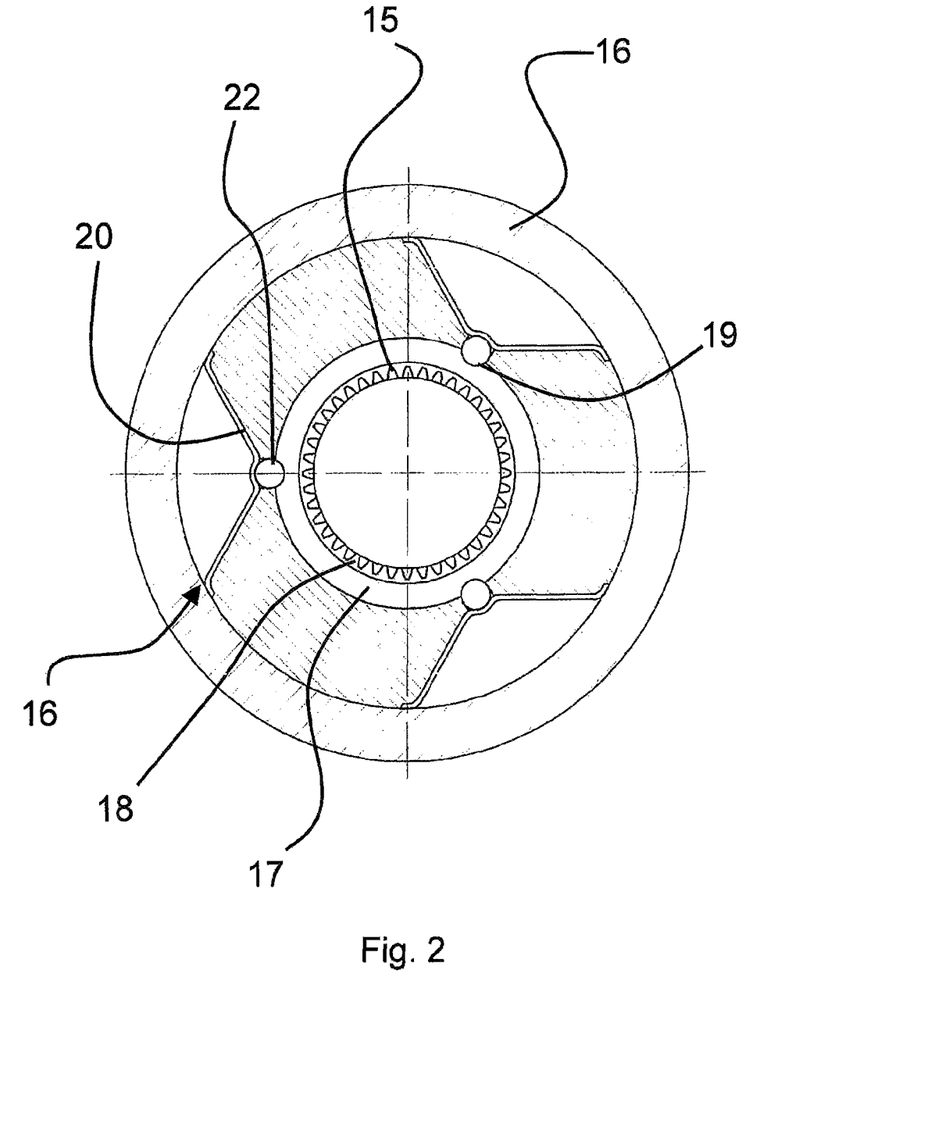
FIG. 2 is a section along line II-II of FIG. 1.

FIG. 2 particularly illustrates the structure of the slip coupling 16 on to the housing 12. In particular, the shape of the biasing leaf springs 20 becomes clear, where in the illustrated embodiment shown, the surfaces of the leaf springs 20 facing away from the coupling element 22 are thickened with vulcanizate in order to increase the coupling moment. Also, the coupling gear teeth 18 of the coupling sleeve 17 that mesh with the external gear teeth 15 of the setting sleeve 14 for rotational coupling can be seen. If the loosening or tightening moment predetermined by the force of the biasing springs 20 is exceeded during adjustment of the chuck jaws 11, the coupling rollers 22 are shifted radially outward against the force of the biasing springs 20, thereby allowing the coupling sleeve 17 that meshes with the setting sleeve 14 to rotate freely. As a result, there is audible ratcheting that makes it clear to the user of the power drill 1 according to the invention that the tightening or loosening process of the chuck jaws 11 has been concluded.

Figure 3:
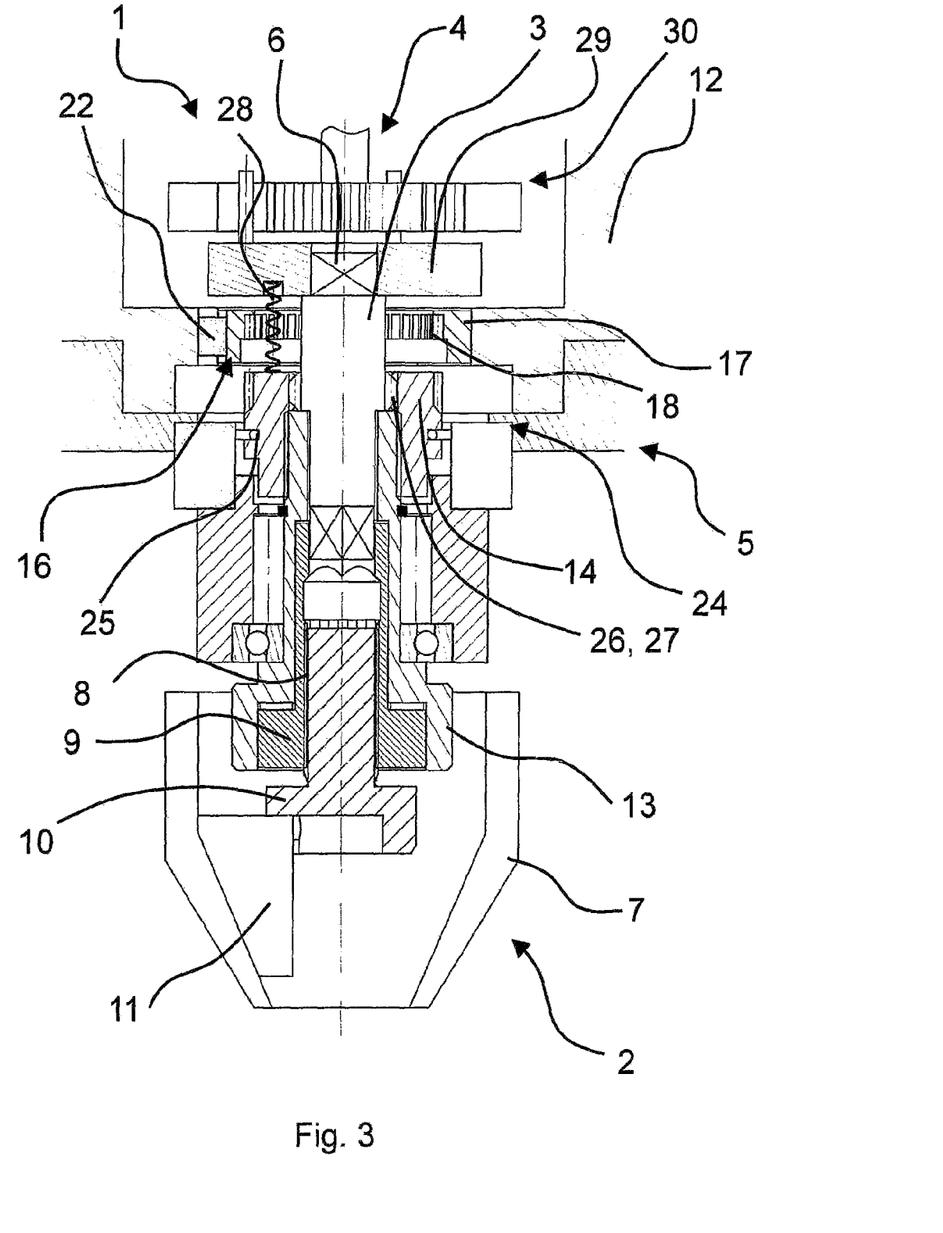
FIG. 3 is a section through of the embodiment of FIG. 1 in the drilling position.

In the drilling position of the first embodiment shown in FIG. 3, the setting sleeve 14 is moved axially toward the chuck jaws 11 and the external locking gear teeth 26 of the arbor 3 mesh with the gear teeth 27. Thus, in the drilling position the shaft 13 is rotationally connected with the arbor 3 by the setting sleeve 14. If the arbor 3 is now rotated by the drive member 4, the complementary coupling formations 6 on the arbor 3 and the planetary carrier 29 of the planetary gear mechanism 30 of the drive member 4 are rotationally connected with one another, and the shaft 13 is also driven. As a result, no relative rotation between the shaft 13 and the arbor 3 takes place, and movement of the chuck jaws 11 is precluded.

Figure 4:
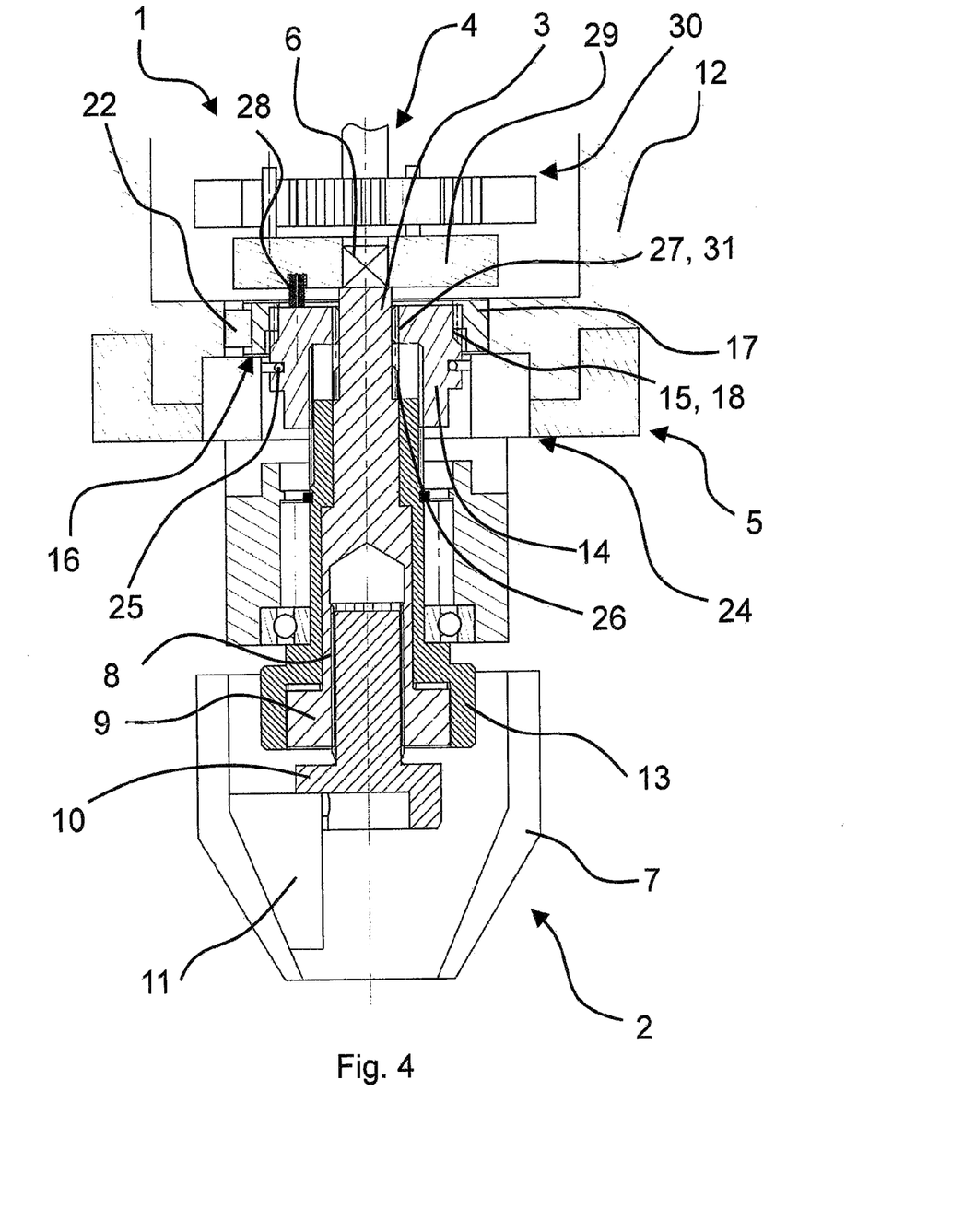
FIG. 4 is a section through a second embodiment of the power drill according to the invention in the tightening position.

FIG. 4 shows a further embodiment of the power drill 1 according to the invention in the tightening position. In the embodiment shown here, the arbor 3 is formed in one piece with the sleeve 9. In order to allow assembly of the arbor 3 with the shaft 13, in this connection, the outside diameter of the locking gear teeth 26 provided on the arbor 3 is smaller than the inside diameter of the shaft 13. In order to nevertheless allow rotational coupling of the arbor 3 with the setting sleeve 14 in the tightening position, the setting sleeve 14 has a collar 31 that carries its gear teeth 27. The arbor 3 that contains the sleeve 9 can therefore be mounted in the shaft 13 easily from the side facing away from the drive member 4. In the embodiment shown in FIG. 4, as well, the setting sleeve 14 is connected with the housing 12 with a force fit, in the tightening position, by the radially acting slip coupling 16.

Figure 5:
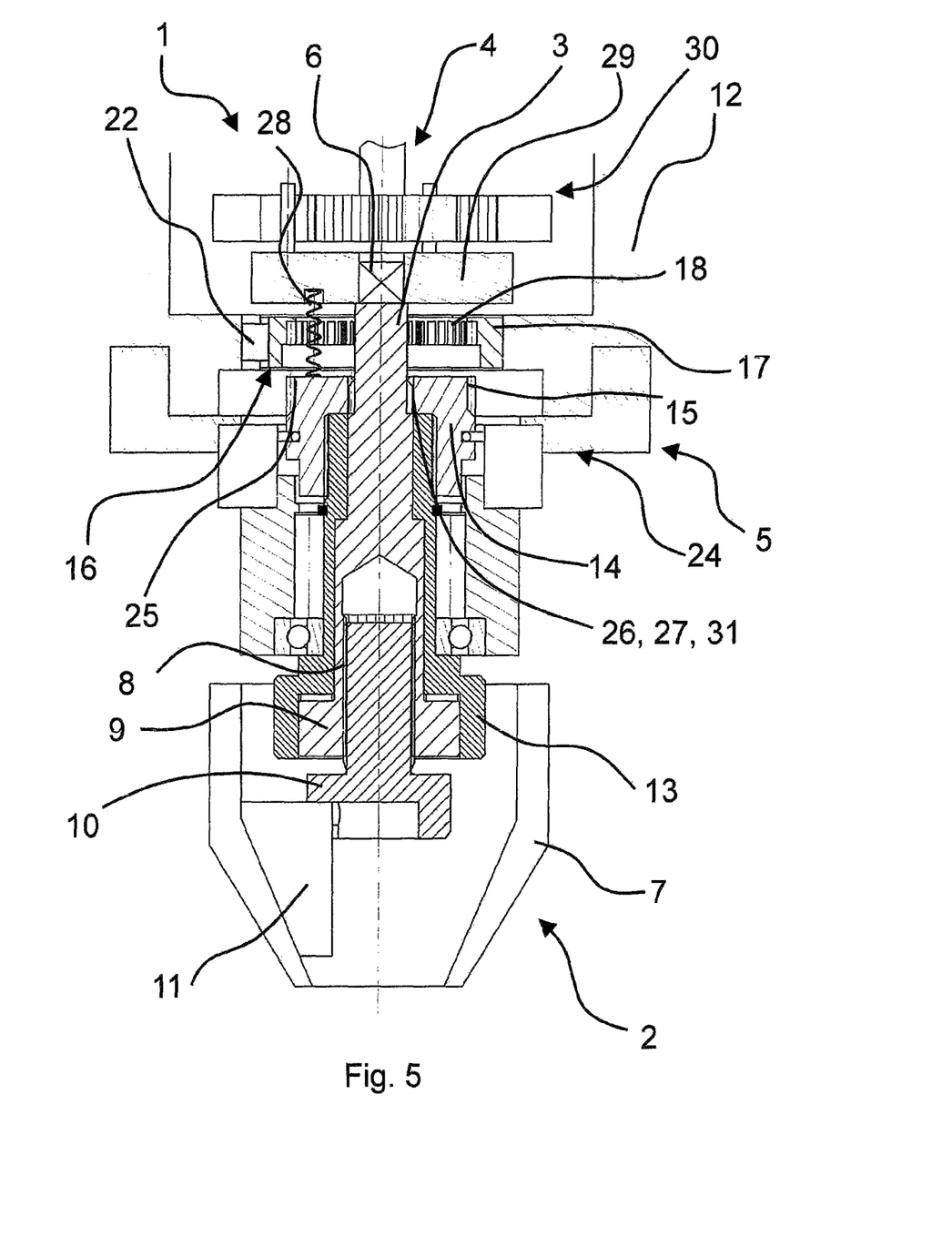
FIG. 5 is a section through the embodiment of FIG. 4 in the drilling position.

FIG. 5 shows the embodiment of FIG. 4 in the drilling position. Here, the setting sleeve 14 engages via a collar 31, with the locking gear teeth 26 on the arbor 3. This way the arbor 3 is rotationally connected with the shaft 13, which precludes unintentional adjustment of the chuck jaws 11.

Figure 6:
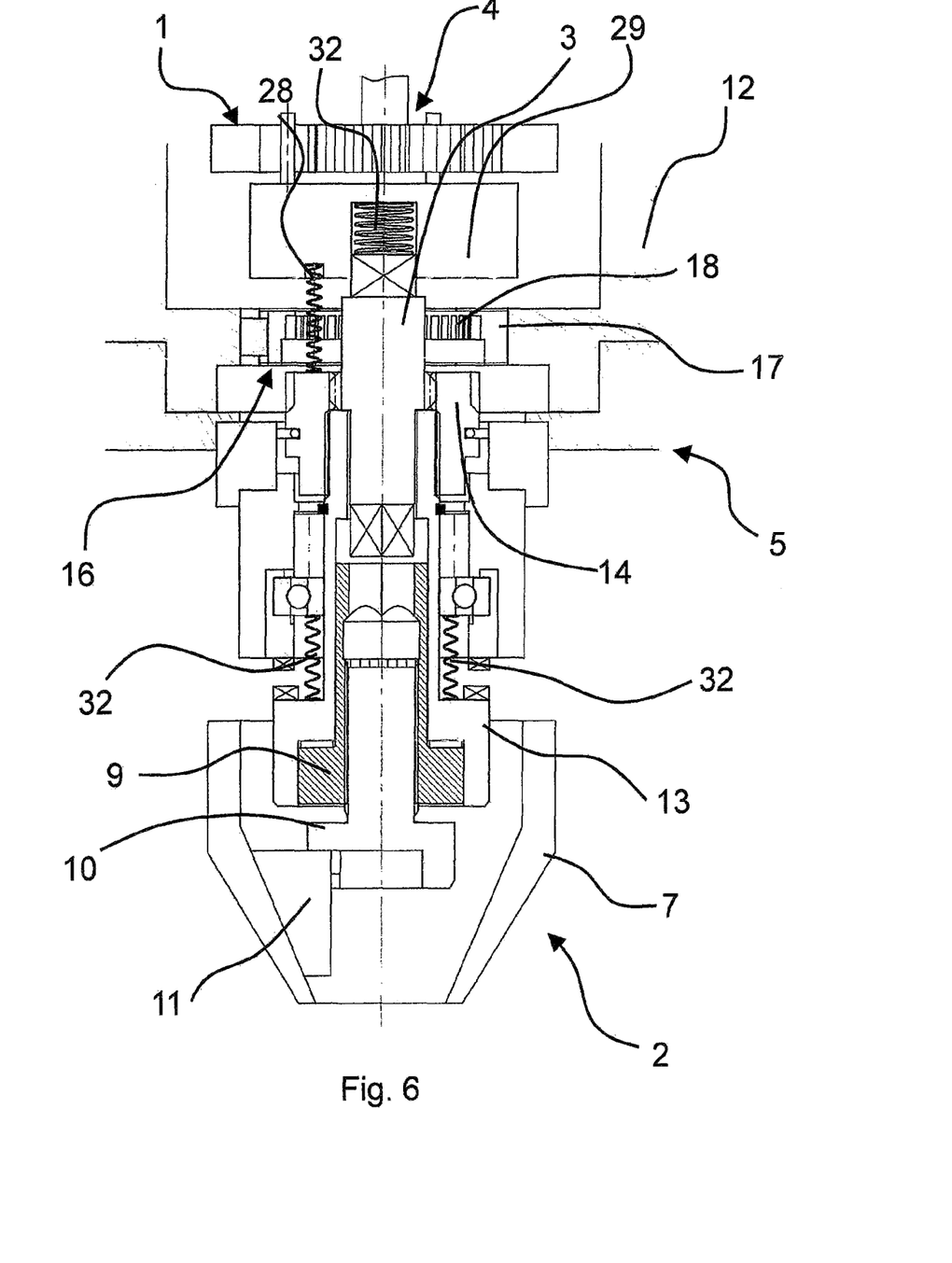
FIG. 6 is a section through a third embodiment of the power drill according to the invention in the drilling position.

FIG. 6 shows another embodiment of the power drill according to the invention, suitable for hammer drilling, in the drilling position. Here, the shaft 13 and the arbor 3 are acted on by springs 32. In this way, during hammer drilling operation, a percussion pulse induced by the drive member 4 of the power drill 1 can be transmitted, in known manner, to a drilling tool held in place between the chuck jaws 11.

In the following, the functioning of the power drill 1 according to the invention will be explained once again. In the tightening position shown in FIGS. 1 and 4, the setting sleeve 14 is rotationally coupled with the housing 12 by the radially acting slip coupling 16, and when the drive member 4 is activated, relative rotation between the arbor 3 and the setting sleeve 14 takes place. Now the chuck jaws 11 guided in the chuck body 7 can be opened or closed—depending on the direction of rotation of the drive member 4—by the spindle drive member formed by the pusher element 10 and the sleeve 9. If the setting sleeve 14 is axially shifted by the coupling wire 25 by operation of the control ring 24, and brought out of engagement with the radial slip coupling 16, then the setting sleeve 14 can now be brought into engagement with the arbor 3 by meshing of the gear teeth 27 and the locking gear teeth 26. The power drill 1 is now in the drilling position shown in FIGS. 3 and 5. Relative rotation between the shaft 13 and the arbor 3 is prevented by rotationally coupling these components, thereby precluding unintentional loosening of the chuck jaws 11.

I claim:

1. A power drill comprising a housing;

a drive member rotatable about an axis in the housing;

an arbor generally outside the housing and coaxial with and permanently rotationally coupled to the drive member;

a drive shaft rotatable about the axis relative to the member;

a chuck body rotatable about the axis and rotationally coupled to the drive shaft;

chuck jaws movable in the chuck body;

a threaded sleeve rotationally connected with the arbor;

a pusher element in the threaded sleeve and bearing on the jaws;

screwthreads between the threaded sleeve and the pusher element for axially shifting the pusher element and the jaws on relative rotation of the pusher element and the sleeve;

a setting sleeve having external gear teeth, axially spaced toward the chuck body from the drive member, permanently rotationally connected to but axially displaceable relative to the shaft, and shiftable between a drilling position and a tightening position in which adjustment of the chuck jaws is possible; and a slip coupling having
a coupling sleeve formed with a radially outwardly open entrainment seat and having internal gear teeth meshing with the external gear teeth of the setting sleeve,
a coupling element radially shiftable in the housing and engageable into the seat to, when engaged in the seat, rotationally couple the coupling sleeve to the housing, and
a biasing element urging the coupling element radially inward into the seat.

2. The power drill according to claim 1, wherein the coupling formation of the drive member is provided on a planetary carrier of a planetary gear mechanism of the drive member.

3. The power drill according to claim 1, wherein the setting sleeve is rotationally coupled with the arbor in the drilling position.

4. The power drill according to claim 3, wherein the arbor has external locking gear teeth that fit complementarily with internal gear teeth of the setting sleeve in the drilling position.

5. The power drill according to claim 1, further comprising:
an elastic element for biasing the setting sleeve from the tightening position to the drilling position.

6. The power drill according to claim 1, wherein the threaded sleeve is integral with the arbor.

7. The power drill according to claim 1, wherein the setting sleeve can be rotationally coupled with the housing in the tightening position.

8. The power drill according to claim 1, wherein the biasing element is a leaf spring.

9. The power drill according to claim 8, wherein a surface of the leaf spring facing away from the coupling element is reinforced with a vulcanizate in order to increase coupling moment.

10. The power drill according to claim 1, wherein the setting sleeve is axially coupled by a wire with a control ring of the housing.

11. A power drill comprising:
a housing;
a motor in the housing;
a drive member rotatable by the motor in the housing about an axis;
an arbor extending along the axis outside the housing and axially juxtaposed with the drive member;
complementary formations on the drive member and the arbor permanently rotationally coupling the drive member to the arbor;
a tube shaft rotatable about the axis on the arbor and having a rear end juxtaposed with the housing and a front end remote from the housing;
a chuck body fixed to the front end of the tube shaft;
a plurality of radially and axially displaceable jaws in the chuck body;
a threaded sleeve in the tube shaft rotationally coupled to the arbor;
a pusher element braced axially forward against the jaws and extending axially rearward into the threaded sleeve;
interengaging screwthreads on the threaded sleeve and pusher element for axial displacement of the pusher element and radial and axial displacement of the jaws on relative rotation of the threaded sleeve and pusher element;
a slip coupling on the housing; and
a setting sleeve rotationally coupled to the rear end of the tube shaft, having external teeth, and axially displaceable between a tightening position engaging the slip coupling and a drilling position disengaged from the slip coupling and rotationally coupled to the arbor, the slip coupling having
a coupling sleeve formed with a radially outwardly open entrainment seat and having internal gear teeth meshing with the external gear teeth of the setting sleeve,
a coupling element radially shiftable in the housing and engageable into the seat to, when engaged in the seat, rotationally couple the coupling sleeve to the housing, and
a biasing element urging the coupling element radially inward into the seat.

* * * * *